(12) United States Patent
Mueller et al.

(10) Patent No.: US 8,972,046 B2
(45) Date of Patent: Mar. 3, 2015

(54) FEED STATION FOR FEEDING FLAT ITEMS TO A PROCESSING APPARATUS

(71) Applicants: Ralf Mueller, Berlin (DE); Volker Baum, Berlin (DE)

(72) Inventors: Ralf Mueller, Berlin (DE); Volker Baum, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 0 days.

(21) Appl. No.: 14/097,760

(22) Filed: Dec. 5, 2013

(65) Prior Publication Data

US 2014/0172156 A1     Jun. 19, 2014

(30) Foreign Application Priority Data

Dec. 7, 2012  (DE) .................... 20 2012 011 876 U

(51) Int. Cl.
| | |
|---|---|
| G06F 7/00 | (2006.01) |
| B65H 5/06 | (2006.01) |
| B65H 7/18 | (2006.01) |
| B65H 3/06 | (2006.01) |
| B65H 7/02 | (2006.01) |
| B65G 43/00 | (2006.01) |
| B65H 7/20 | (2006.01) |
| B65H 1/26 | (2006.01) |
| B65H 7/06 | (2006.01) |

(52) U.S. Cl.
CPC ............... *B65G 43/00* (2013.01); *B65H 5/062* (2013.01); *B65H 2701/1916* (2013.01); *B65H 2513/104* (2013.01); *B65H 2701/1313* (2013.01); *B65H 7/18* (2013.01); *B65H 2511/22* (2013.01); *B65H 3/0653* (2013.01); *B65H 2701/1311* (2013.01); *B65H 2513/53* (2013.01); *B65H 2301/4452* (2013.01); *B65H 7/02* (2013.01); *B65H 2553/82* (2013.01); *B65H 7/20* (2013.01); *B65H 2553/51* (2013.01); *B65H 1/266* (2013.01); *B65H 7/06* (2013.01); *B65H 2553/412* (2013.01)
USPC .......................................... 700/230; 700/228

(58) Field of Classification Search
USPC ................................................. 700/230, 228
See application file for complete search history.

(56) References Cited

U.S. PATENT DOCUMENTS

| | | |
|---|---|---|
| 2004/0223797 A1 | 11/2004 | Ueda |
| 2009/0273135 A1 | 11/2009 | Malevanets |

FOREIGN PATENT DOCUMENTS

| | | |
|---|---|---|
| DE | 101 27 993 | 12/2002 |
| JP | H06286905 | 11/1994 |
| WO | WO-92/16444 A1 | 10/1992 |

*Primary Examiner* — Ramya Burgess
(74) *Attorney, Agent, or Firm* — Schiff Hardin LLP

(57) ABSTRACT

A feed station feeds a flow of items along a transport path, in which a path, a path point W2 is orthogonal to the position of a first transport roller, a path point W3 is orthogonal to the position of a sensor, and a path point W4 is orthogonal to a second transport roller. A distance between W3 and W4 is smaller than the minimum length of the flat items and is greater than or equal to a distance between W4 and a path end point Wend. A distance between Wend and an intake point W4-Wend of the subsequent goods processing apparatus is much smaller than the W4-Wend distance. A transport velocity distance between the separated flat items at the start of the transport path is controlled to a minimum distance and is always the same size when the items leave the feed station.

12 Claims, 12 Drawing Sheets

FEED STATION FOR FEEDING FLAT ITEMS TO A PROCESSING APPARATUS

BACKGROUND OF THE INVENTION

1. Field of the Invention

The invention concerns a feed station for feeding a flat item individually or from a stack to a subsequent processing apparatus for the item. Such a flat item can be a thin mail piece such as a postcard, "normal" mail item of medium thickness (for example the "standard letter" in Germany) and thick mail pieces (for example as a "compact letter" in Germany). A mail piece is considered to be flat when it has a small thickness in comparison to the remaining dimensions of its format, situated in an x/y-plane of a Cartesian coordinate system. The feed station has a controller that controls the feed so that a high throughput is achieved. Such a feed station is used in connection with franking machines, addressing machines and other mail processing apparatuses.

2. Description of the Prior Art

Feeds of many different types are known in which the drive elements are mechanically coupled. Especially for short items, i.e. letters or mail pieces having a short format, separation drives are known that impress a drive force on a subsequent item that follows a current item very early so that the items are separated without large gaps therebetween or with an insufficient gap. Moreover, there is no possibility to vary these gaps within the feed.

A separation device from the company Neopost has two separation rollers and a transport device with one roller, with the rollers are all permanently kinematically coupled with one another. A sluice of the separation device is formed by a gap between the second separation roller and by a number of fingers at the head of a rocker. The gap has dimensions that correspond to a width and a height of filled, commercially available letter envelopes. A stack of mail pieces is placed on the first separation roller. As soon as the first separation roller releases the lowermost mail piece of the stack by its rotation, a transport force is immediately impressed by the first separation roller on a second lowermost mail piece. Different formats likewise have an influence on the separation. Although the separation device can be adapted to other formats by a mechanical displacement or adjustment, an automatic adaptation is not possible. Due to the lack of an additional sensor, no letter length measurement (and thus also no different control for different letter lengths) is possible. Additional disadvantages of the aforementioned separation device are that no gap monitoring (and thus also no optimization of the gaps) in the feed station is possible. The fixed kinematic coupling of the drive rollers does not allow a coordination of the separation velocity and/or the transport velocity, or a gap adjustment.

A franking system from Francotyp-Postalia GmbH has a feed station with a separation device and with a transport device, wherein—in the mail transport path—the feed station is arranged upstream in terms of mail flow of an Ultimail®-type franking machine. The separation device of the feed station has a transport belt in the pre-separation region. A drive drives the transport belt and the transport device, which are coupled with one another in terms of actuation. An additional drive acts on a separation roller. The sluice of the separation device is formed by a gap between the separation roller and by a number of fingers at the head of a rocker, which are arranged over the separation roller. It has been empirically established that the requirements for the reliability of the separation given a high throughput of flat items are satisfied with a high certainty only for a narrow spectrum (for example a defined type) of stacked mail goods. A sloped housing before the gap has a continuous tapering in the input region and causes compression of the mail pieces in the stack. Thick mail pieces cannot be separated from the stack if the gap through which a mail piece is sluiced has been set to be too narrow. However, if the gap has been set too wide, errors occur in the separation, in particular given a high throughput of flat items. The throughput likewise turns out to be less than maximum due to large gaps between the successive mail pieces, in particular given short mail pieces (postcards, for example). As soon as the lowermost mail piece releases (exits) the first separation roller by rotation of the transport belt, a transport force is impressed by the first separation roller on a respective second mail piece. This can likewise lead to separation errors. The surface friction value of the transport belt must be very exactly matched to the mail piece surface so that a propulsive force that is excessively strong is not impressed on the respective second lowermost mail piece of the stack. The reliability of the separation would be increased if a propulsive force acted only on the mail piece that should be separated and supplied.

A separation device for flat articles is known from DE10127993A1 that has a feed belt on driven deflection rollers and retention means. The retention means includes a separation element which with the feed belt forms a sluice via which the separated flat articles are transported along the entire length. The feed belt is designed as a segmented belt that has a pull-in segment and a sliding segment. Upon placement of a mail piece or stack of mail pieces, a first motor and a second motor are automatically activated by a controller when a first sensor detects the placement. The stack is transported to the retention means of the separation means as soon as the first motor is activated. The stack is separated by the lowermost mail piece being removed, and the second motor is controlled accordingly by the controller. An encoder electrically connected with the controller serves for the detection of the position reached by the pull-in segment and (via the controller) maintains the rotation speed constant of the second drive upon separation. The flat article can be pulled out from the separation device by rollers of an ejection device that are driven by a third motor and can subsequently be ejected from the separation device. The third motor is also controlled by the controller. In spite of a significant cost in motors, sensors and mechanical components, the separation device does not allow a predetermined gap to be maintained between successive flat articles, in particular mail pieces with varying thickness.

A franking system has different types of flat items such as postcards and letters of the C6, C6 long, B4 formats etc. However, the different flat letter items require different processing velocities during the separation if the separation should be achieved with a high probability. These velocities are then below the transition velocity from the feed station to a subsequent goods processing apparatus (a franking machine, for example). Gaps of different sizes thus arise between two successive flat items that can contribute to significantly reducing the throughput. Gaps of different size between successive flat items additionally result given different friction during their separation.

SUMMARY OF THE INVENTION

An object of the invention is to remedy the deficiencies described above of known feed devices. An automatic feed for a flat item should be developed that operates very reliably and achieves uniform gaps between the flat items in spite of a slippage between the good and the separation device, in order to achieve a uniformly high throughput of flat items.

Via the feed station, a flat item is separated individually or from a stack and is supplied to a subsequent mail processing apparatus. The feed station has a separation region and a transport region. The transport region is arranged in a transport path downstream (in terms of the mail flow) of the separation region. The feed station has drive motors with associated encoders, additional mechanical drive elements, sensors and a control unit to control a transport device. The control unit is connected (in terms of wiring) at the inputs with a number of sensors and encoders.

In the transport path, a first path point W1 is orthogonal to the position of a second sensor that detects leading and trailing edges of the items moving in the transport path. A second path point W2 is orthogonal to the position of the rotation axle shaft of a first transport roller. A third path point W3 is orthogonal to the position of another sensor, and a fourth path point W4 can be depicted orthogonal to the position of the rotation axle shaft of a second transport roller.

Furthermore, a first distance (spacing or distance) is provided between the third path point W3 and the fourth path point W4 and a second distance is provided between the fourth path point W4 and a path end point Wend, so the path end point lies at a third distance from a subsequent path intake point WIn. The path intake point WIn on the transport path is orthogonal to the position of the rotation axle shaft of a drive element at the intake of the subsequent goods processing apparatus. The aforementioned distances are each constant. The first distance is smaller than the minimum length of the flat items to be transported, and the first distance is larger than or equal to the second distance, and the third distance is much smaller than the second distance.

The feed station has a control unit that is programmed to control the transport velocity of the transport device so that a distance—determined at the start of the transport region—between the separated flat items is reduced to a minimum distance and is always the same size when these goods leave the feed station. The transport device is driven by a transport motor.

The control unit of the feed station has at least one determination unit that determines the position of the flat item in the transport path, and a processor. A counter i is increased by the signals of an encoder produced by the running of the transport motor. This counter is reset to zero before each start of the transport motor. The current counter state (designated "i") is stored when a good to be transported reaches or leaves the position of a sensor. The orthogonal orientation of the position of a drive element likewise results in a path point situated on the transport path. The arrangement of the sensors and drive elements takes place in a frame of the feed station at a position orthogonal to the transport path. Every orthogonal location of a position corresponds to a path point on the transport path, and the path points are situated in a row in the transport direction. When the leading edge of a mail piece reaches the position of each sensor, this is designated as occupation of the sensor. When the trailing edge of a mail piece leaves the position of a sensor that is designated as vacating (releasing) the sensor.

Since the counters are continually incremented further given a running transport motor, stored counter states upon occupation of a sensor are always smaller than upon vacating the same sensor. The processor is programmed by an application program (stored in a program memory of the control unit) to determine the respective position of the current separated flat item and a preceding transported first flat item, as well as a number of parameters to achieve a temporarily increased transport velocity of a currently separated flat item in order to reduce a gap that is too large at the beginning of the transport region of these goods, to a minimum distance.

It is assumed that a predetermined transport velocity has been stipulated between the feed station and a subsequent goods processing apparatus downstream thereof (in terms of the mail flow) in order to pass flat items from the feed station to the subsequent goods processing apparatus, for example a franking machine. The transport device of the feed station has two transport rollers and a sensor positioned between the two transport rollers, the sensor being downstream (in terms of the flow) in the transport direction, near the first transport roller. The region between the two transport rollers is designated in the following as a transport region. A first distance A exists between the orthogonal designation of the position of the aforementioned sensor at a third path point and the orthogonal designation of the position of a rotation axle shaft of the second transport roller at a fourth path point. A second distance B exists between the fourth path point and a path end point, and a third distance C exists between the path end point and a path intake point at which the orthogonal designation of the position of the rotation axle shaft of a drive element of the subsequent goods processing apparatus. The distances A, B, C are constant (dependent on design) and each can be defined as a fixed number of encoder pulses.

The gap constancy can be improved when the drive motor of the transport device (called a transport motor in the following) is controlled so that a variable transport velocity is achieved by the separated flat items in order to compensate for different distances (gaps) between the separated flat items via the feed station. The increased transport velocity is chosen depending on the current gap size and to be greater than the stipulated predetermined transport velocity. The transport motor can be operated faster to transport the currently separated flat item only if the preceding transported first flat item has left the second transport roller of the transport device, such that its further transport is no longer caused by the feed station. Therefore, the respective position of the currently separated flat item and the preceding transported flat item is determined by the control unit. The control unit of the feed station calculates a path start point and a path end point for the currently transported flat item using selected counter states of the counter. These counter states determine that path point at which encoder count value of the transport motor is operated faster (path start point), or with normal velocity (path end point). As soon as the trailing edge of the preceding transported first flat item leaves the fourth path point, the leading edge of the currently transported flat item reaches the path start point, and the increased transport velocity of the transport motor can be activated for the current separated flat item. As soon as the leading edge of the flat item that is being transported further by the rollers of the transport device reaches the path end point, the increased transport velocity is reduced again to the stipulated transport velocity. A numerical value for the increased transport velocity is calculated from a multiplication of a numerical value for the boost count region with a factor that results from the quotient of the numerical value of the predetermined transport velocity and the sum of constants for the minimum distance between items and the second distance.

Moreover, such (virtual) positions for a flat item can also be determined that lie downstream (in terms of the flow) on the transport path outside of the feed station. A number of sensors are electrically connected with the control unit, which has a signal processor for the signals of the sensors and a determination unit that determines the position of the flat item on the transport path. The sensors are arranged one after another on the transport path in the transport direction. A first sensor is provided to detect the position of a flat item at the start of a separation region, a second sensor is provided to detect the position of a flat item before the transport region at a first path point, and a third sensor is provided to detect the position of a flat item within the transport region at a third path point. A processor of the control unit is programmed by an application program stored in a program memory so that the control unit controls a drive motor of a separation device (called a separation motor in the following) so that a flat item is separated with a predetermined separation velocity from a stack of goods (located upstream, in terms flow of items, at the feed station) in the separation region of the feed station. The separated item is subsequently transported further by of the transport device. In the control of the transport motor, an encoder is used which is already utilized in a known manner in the velocity regulation of the transport motor. An encoder wheel that is scanned by encoder electronics is arranged on the motor axle shaft of the transport motor. The encoder signals are supplied to the signal processing means and counted by a counter of the determination means given a running transport motor. The number of encoder signals (pulses) thus reflects the traveled path of the flat item on the transport path. It is assumed that no slippage occurs between the transport roller and the item to be transported. The determination of the position of the flat item in the transport path by the determination unit is possible based on the counted encoder signals and the signals of the sensors that are arranged on the transport path. The respective counted encoder count values are associated with each flat item in the transport path upon occupying and vacating (passing) the third sensor. When the leading edge of a separated flat item reaches the third sensor in the transport path, it is determined how large the distance is between this and the trailing edge of the first flat item that was previously separated and leaves the feed station downstream (in terms of the flow). The distance may be reduced to a minimum distance in the event that the distance is greater than the minimum distance. For this purpose, the control unit (controlled by a program) controls the transport motor of the transport device in the transport region of the feed station so that a separate flat item is transported downstream (in terms of the mail flow) with a variable transport velocity, and after this is supplied to a subsequent item-processing apparatus with a predetermined transport velocity. The throughput can be increased in the event of the distance being too large can be achieved by operating the transport motor temporarily to produce a higher transport velocity, in order to achieve uniformly small gaps between the separated flat items. An encoder delivers the encoder signals for a measurement value that represents the real value of the transport velocity relative to time. The deviation of the measurement value relative to a desired value can be used to activate/deactivate the transport motor and/or for its velocity regulation. A digital regulation by a processor of the control unit of the feed station enables a velocity regulation to keep the transport velocity constant at an arbitrary value. From the count values of the counted signals of an encoder arranged at the transport motor, the control unit can determine the positions of the current and the previous transported flat item, and can also determine the length of the flat item transported past the sensors. Upon passing the sensors, the count states are associated with the flat items by a processor of the control unit. The count states of the of the number of signals delivered by the encoder correspond to specific positions in the transport path which the leading edge or trailing edge of a flat item achieves. Reaching and/or leaving these positions are detected by sensors. The gap between the separated flat items and the length of the flat items can be determined the control unit by means of the counter with the participation of the third sensor. The counter can be realized via hardware and/or software.

The counter is preferably a component of the determination unit that determines the position of the flat item in the transport path.

DESCRIPTION OF THE PREFERRED EMBODIMENTS

Figure 1:
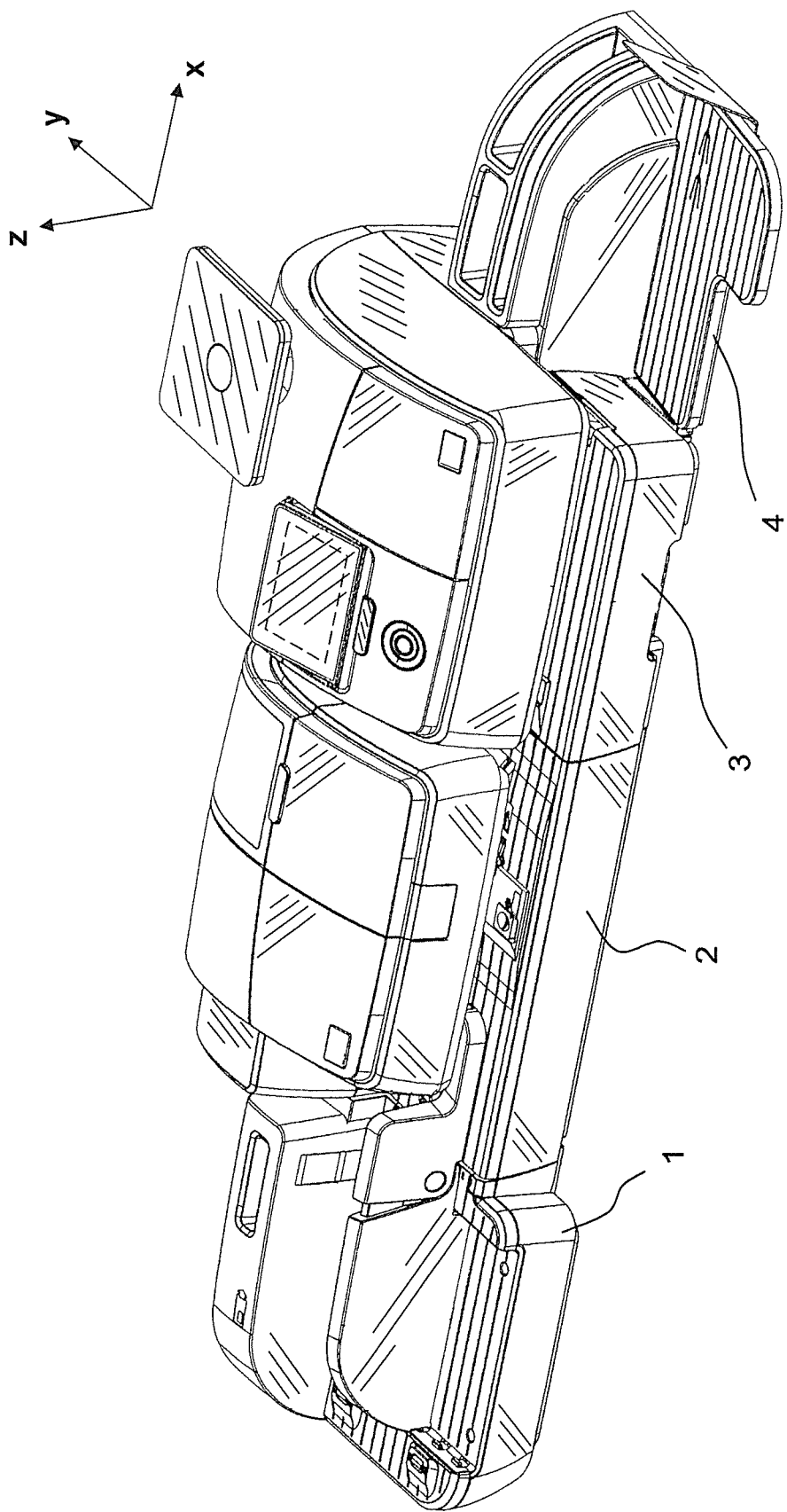
FIG. 1 is a perspective view of a mail processing system, with a modular placement device, a feed station, a franking machine, and a stacking device.

FIG. 1 shows a perspective view from the upper right front of a mail processing system, with a modular placement device 1, a feed station 2, a franking machine as a an item processing apparatus 3, and a stacking device 4. The transport direction is the x-direction of a Cartesian coordinate system the y-direction of which points toward the back side of the apparatuses of the system and the z-direction of which points upwardly.

Figure 2A:
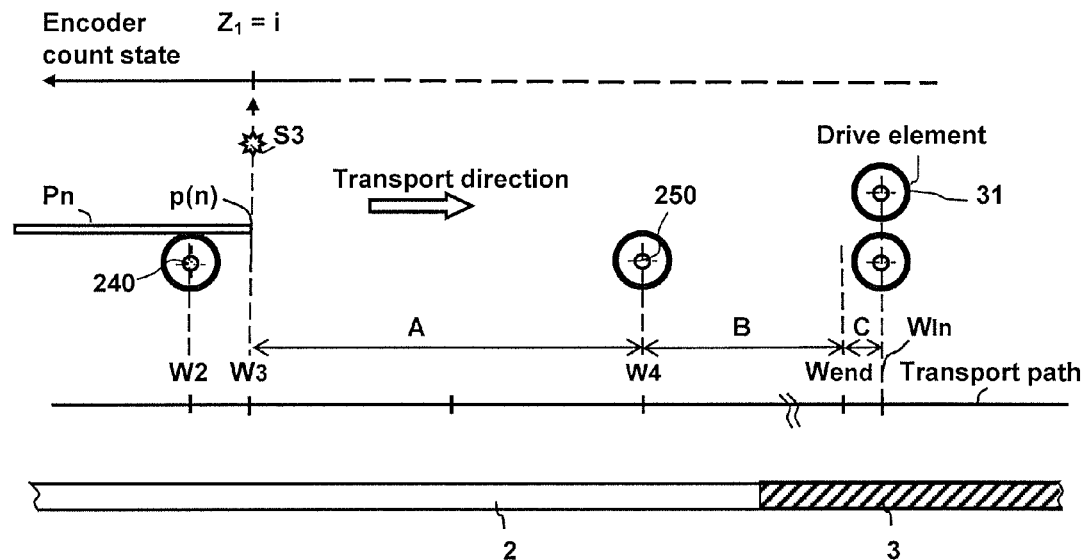
FIG. 2a schematically illustrates the transport region during a first phase of the transport of a mail piece Pn.

FIG. 2a is a schematic presentation of the transport region during a first phase of the transport of a mail piece Pn. The depiction of path points of the transport path is explained using FIG. 2a. The rotation axle shaft 240 of a first transport roller is associated with a second path point W2, a sensor S3 is associated with a third path point W3, and the rotation axle shaft 250 of a second transport roller is associated with a fourth path point W4. The two transport rollers of the feed station 2 are driven by the rotation axle shafts (the manner is not shown) together with a transport motor, such that the mail piece Pn is transported in the transport device (white arrow). A distance A is situated between the third path point W3 and the fourth path point W4 of the second transport roller. A distance B is situated between the fourth path point W4 and a path end point Wend. A rotation axle shaft of a drive element 31 (for example a deflection roller of a transport belt of a subsequent goods processing apparatus 3) is associated with a path intake point WIn that is situated at a distance C on the transport path, following the path end point Wend. The distance C is smaller than the radius of the deflection roller or the drive element 31 but at least so large that the position of the path end point Wend still does not coincide with the position WIn on the transport path. The distances A, B and C are each constant and predetermined by the mechanical dimensions of the feed station 2 and the goods processing apparatus 3, wherein A≥B>>C. The distance between the rotation axle shafts 240 and 250 of the transport rollers corresponds to a minimum length Lmin of the flat items to be transported. The first distance A is smaller than Lmin. A count state $Z_1=i$ is achieved when the leading edge p(n) of the first mail piece Pn is detected by the sensor S3.

Figure 2B:
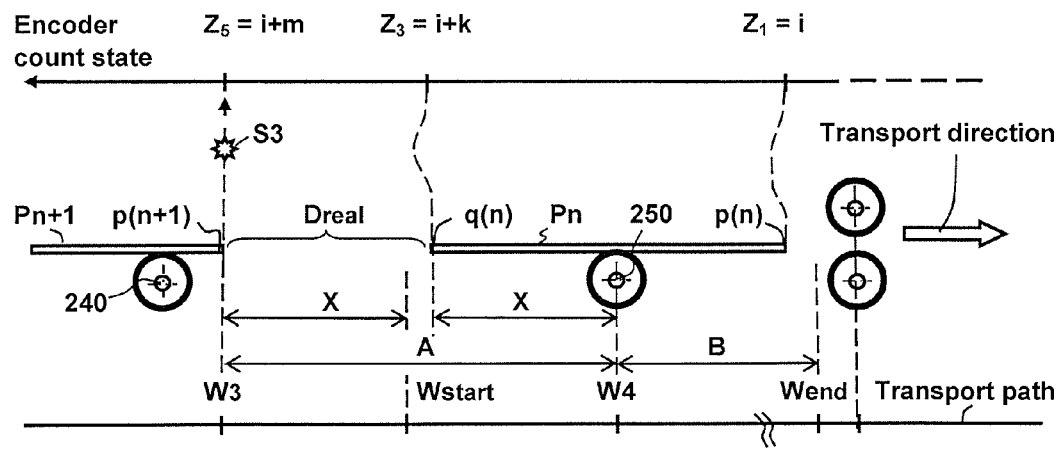
FIG. 2b schematically illustrates the transport region during a second phase of the transport of the mail piece Pn.

FIG. 2b shows a schematic representation of the transport region of the feed station 2 during a second phase of the transport of the first mail piece Pn. The leading edge p(n) is furthermore associated with the first count state $Z_1=i$, although the mail piece Pn has been transported further in the transport direction (white arrow). In the meanwhile, the leading edge q(n) of the first mail piece q(n) of the first mail piece Pn has also left the detection region of the sensor S3. k encoder pulses have been counted. An additional count state $Z_3=i+k$ has thereby been achieved that is now indicative of the trailing edge q(n) of the first mail piece Pn. During the second phase of the transport of the mail piece Pn, the leading edge p(n+1) of a of a subsequent separated mail piece Pn+1 arrives in the detection region of the sensor S3. A count state $Z_5=i+m$ with m>k has been achieved that is now indicative of the leading edge p(n+1) of the mail piece Pn+1.

It is likewise apparent that the transport motor can be operated with increased velocity for a subsequent mail piece Pn+1 only when a first mail piece Pn has completely left the second transport roller. This is the case only when the trailing edge q(n) of the first mail piece Pn has been transported by a distance X up to the fourth path point W4. The leading edge p(n+1) of the subsequent mail piece Pn1 is also transported further by the same distance X in the same time period since both transport rollers of the transport region are of identical design and have a common drive. Given a constant distance A and a known position of the first mail piece Pn in the transport path, at which count state the leading edge p(n+1) of the mail piece Pn+1 must have traveled the distance X can be calculated in advance. A count state $Z_3$ of the counter has already been stored when the trailing edge q(n) of the first mail piece Pn left the third path point W3. A count value which corresponds to the distance A is added to the count state $Z_3$ by the processor of the control unit. If the count state calculated in advance is reached by the counter, the leading edge p(n+1) of the subsequent mail piece Pn+1 then has a path start point Wstart within the transport region. The transport velocity of the mail piece Pn+1 can now be increased.

The increased transport velocity must be reduced when the leading edge p(n+1) of the mail piece Pn+1 transported faster reaches the path end point Wend. Otherwise, the mail piece would be transported with different velocity by rollers and be deformed if it were to reach the item-processing apparatus 3 with an increased transport velocity, because the item-processing apparatus 3 has a separately regulated drive to keep the predetermined transport velocity constant.

The item-processing apparatus 3 that is arranged downstream (in terms of the mail flow) of the feed station can be, for example, a franking machine. The mail pieces are transported in the transport region of the feed station 2 by two transport rollers that are mounted on jointly driven rotation axle shafts 240 and 250. A sensor S3 is arranged downstream (in terms of the mail flow) of the rotation axle shaft 240. A third path point is depicted on the transport path, orthogonal to the position of this arrangement. The leading and trailing edges of the mail pieces that pass the third sensor S3 are detected by the third sensor 53. The respective current encoder count value for these edges is stored. Since the encoder counter is increased at every new encoder signal, the encoder count values are increasing from the leading edge to the trailing edge of a mail piece and at the leading edge of the immediately following mail piece Pn+1. Since the encoder count state increases continuously during running of the transport motor, the current position of this mail piece in the transport path can be determined with the current encoder count state and the stored encoder count states for the leading or trailing edges of the mail piece, even when the mail piece has long ago left the feed station.

A first encoder counter state $Z_1=i$ is stored if the first mail piece Pn has passed the sensor S3 with its leading edge, and the encoder counter state $Z_3=i+k$ is stored upon passage of the trailing edge.

A current mail piece Pn+1, which was currently separated by the feed station, now follows after the first mail piece Pn. Additional encoder signals of the second encoder EN2 are counted (which increases the count state of the electronic counter) until the leading edge of the currently separated mail piece Pn+1 reaches the path point W3. The encoder count state for the position of the leading edge of the mail piece Pn+1 then amounts to $Z_5=i+m$.

The difference Δ between the two count states $Z_5$ and $Z_3$ corresponds to a count value Z(Dreal) which can be determined for the current gap Dreal that was determined between the mail pieces Pn and Pn+1 following one immediately after the other. The difference results as:

$$Z(Dreal) = Z_5 - Z_3 \quad (1)$$

The path start point WStart is reached by the current separated mail piece Pn+1 when the first mail piece Pn leaves the transport region of the feed station. The first mail piece is then transported exclusively by the subsequent goods processing apparatus 3. The further transport of the current separated mail piece Pn+1 in the transport region can thereby be accelerated. A count state which corresponds to the path start point WStart is calculated from:

$$Z(WStart) = Z_3 + Z(A) \quad (2)$$

wherein $Z_3=i+k$ and is measured when the leading edge of the first mail piece Pn leaves the third sensor S3. The value k is proportional to the length L of the mail piece Pn. The count value Z(A) corresponds to the distance A between the third sensor S3 and the rotation axle shaft 250 of the second transport roller.

The increased transport velocity VTBoost of the current separated mail piece Pn+1 is again reduced to the desired value VDesired when the leading edge of the additionally transported mail piece Pn+1 reaches the path end point Wend. A count state which corresponds to the path end point Wend results from:

$$Z(Wend) = Z_5 + Z(A) + Z(B) \quad (3)$$

wherein $Z_5=i+m$ and is measured when the leading edge p(n+1) of the current separated mail piece Pn+1 reaches the third sensor S3. Both count values Z(A) and Z(B) are constants which are provided by the mechanical design. The count value Z(B) corresponds to the distance B between the rotation axle shaft 250 of the second transport roller of the feed station and a path end point Wend. This is situated before a rotation axle shaft, for example of a deflection roller of a transport belt at the intake of a franking machine. The path intake point WIn identifies the depiction of the position of the rotation axle shaft of the deflection roller or another drive element 31 of the subsequently arranged apparatus on the transport path.

A boost region is the maximum region in the transport path in which the current separated mail piece Pn+1 may be transported faster. It begins at the path start point and ends at the path end point. A numerical value for the boost count region then results:

$$ZBoost = Z(Wend) - Z(Wstart) \qquad (4)$$
$$= Z_5 + Z(A) + Z(B) - (Z_3 + Z(A))$$
$$= (i + m) - (i + k) + Z(B)$$
$$= Z(Dreal) + Z(B), \text{ wherein } Z(Dreal) \le Z(A).$$

A current gap Dreal is proportional to the count value Z(Dreal). A minimum distance for the gap has been determined empirically and may not be reduced or shifted. The minimum distance Dmin of the gap corresponds again to a numerical value Z(Dmin). A current gap Dreal is always a distance between the successive separated mail pieces. Given too large a current gap, a positive remaining distance R results from the difference between current gap and the minimum distance Dmin:

$$R = Dreal - Dmin \qquad (5)$$

The remaining distance R indicates by what amount the current gaps between the mail pieces should be closed. A numerical value Z(R) is proportional to the remaining distance R. The level of the increased transport velocity VBoost results from:

$$VTBoost = (VTdesired \cdot Boost \text{ region})/(Boost \text{ region} - R) \qquad (6)$$

with the desired transport velocity VTdesired which has been stipulated for the transfer of a mail piece from the feed station and the franking machine.

Due to the increased transport velocity VTBoost, a current gap Dreal=Dmin+R that has been created is reduced to the minimum distance Dmin (FIGS. 5$i,j$) and the throughput is increased. The level of the increased transport velocity VTBoost is limited by an upper maximum level that is predetermined by the properties or, respectively, parameters of the transport device. Both the increased transport velocity VTBoost and the desired transport velocity VTdesired can be replaced by a numerical value. The following equation thus results:

$$Z(VTBoost) = Z(VTdesired) \cdot (Z(Dreal) + Z(B))/(Z(Dmin) + Z(R) + Z(B) - Z(R))$$

$$Z(VTBoost) = Z(VTdesired) \cdot (Z(Dreal) + Z(B))/(Z(Dmin) + Z(B))$$

$$Z(VTBoost) = Z(C) \cdot (Z(Dreal) + Z(B)) \qquad (7)$$

with $Z(C) = Z(VTdesired)/(Z(Dmin) + Z(B)) = $ constant.

Figure 3A:
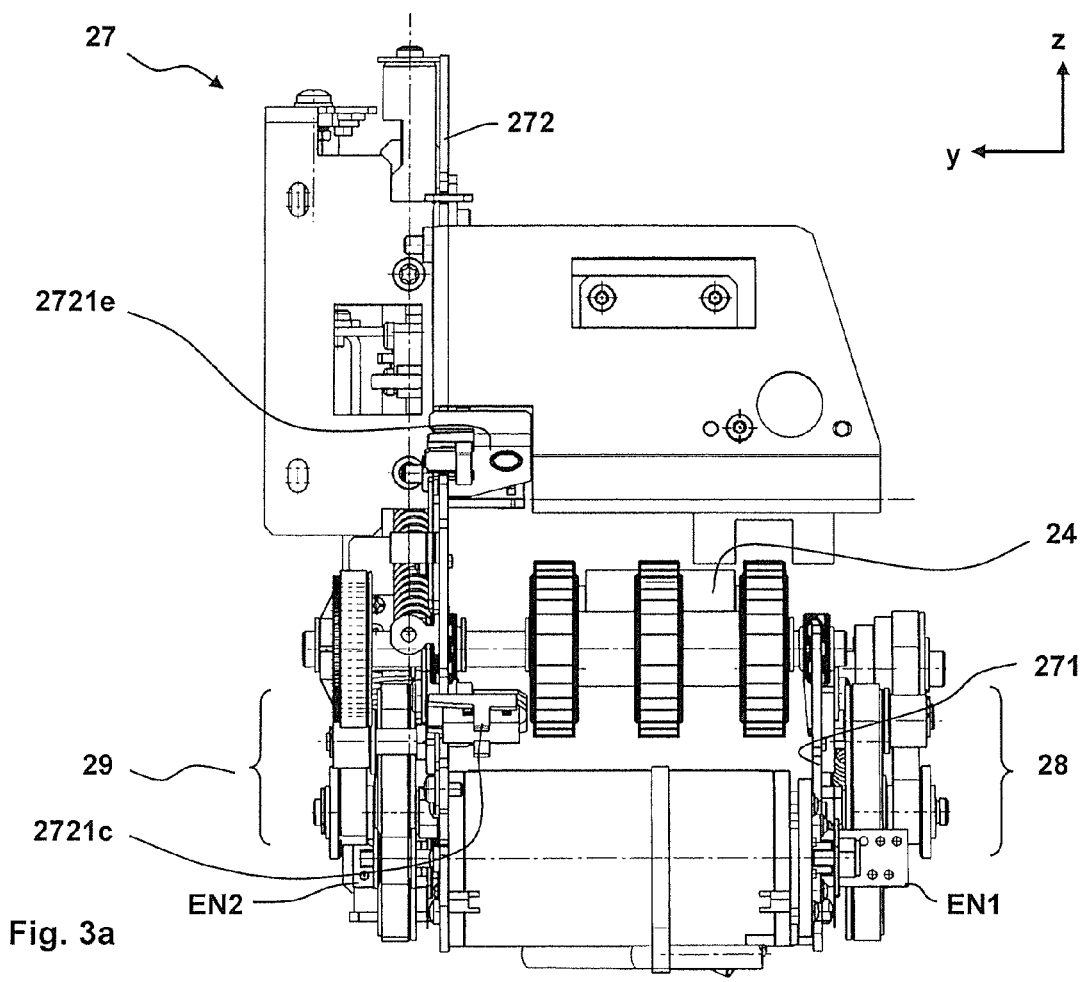
FIG. 3a is a side view of the mechanical design of the feed station, seen from the left.
Figure 3B:
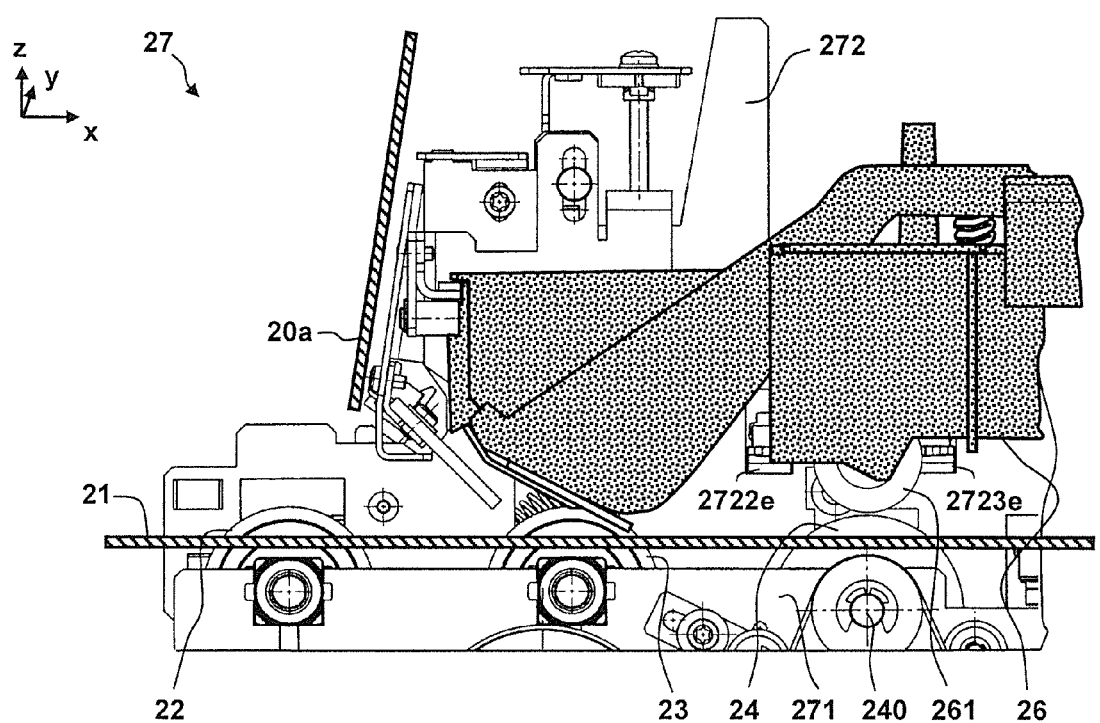
FIG. 3b is a view of the separation region in the frame, seen from the front.

FIG. 3$a$ shows the mechanical design and arrangement of components at a frame 27 of the feed station, in a side view from the left. The first actuation device 29 is arranged on the back side of the rear frame wall 272 and is driven by the direct current motor 295 (shown in FIG. 4$a$). The first actuation device 29 drives both separation rollers. The second actuation device 28 is arranged on the front side of the front frame wall 271 and drives both transport rollers. The second transport roller is covered by the first transport roller 24. A mount 2721$e$ of a first light emitter is attached to the rear frame wall 272. The attachment of a mount 2721$c$ of a first light collector likewise takes place at the rear frame wall 272. The light emitter and light collector are components of a photoelectric barrier that are used as a first sensor. An encoder EN1 is arranged on the side of the actuation device 28 and detects the actuation of the two separation rollers. An encoder EN2 is arranged on the side of the actuation device 29 and detects the actuation of the two transport rollers. The encoders are designed in a known manner. An encoder wheel which is scanned by an electronic encoder is arranged on each motor axle shaft. For better clarity, a pressure box with the rocker and some elements of the frame and the actuation device (which will be further explained using FIG. 3$b$) are not shown in FIG. 3$a$.

FIG. 3$b$ shows a view of the separation region in the frame from the front. A stack of mail pieces is placed at the feed deck 21 and rests on the wall of the housing part 20$a$ of the feed station, which wall is at the mail intake. A pressure box 26 has a first pressure roller 261 which is elastically mounted (the manner is not shown) and situated opposite the first transport roller 24. The pressure box 26 has a second pressure roller (not shown) downstream (in terms of the mail flow). It is of similar design (the manner is not shown), likewise elastically mounted and situated opposite the second transport roller (not shown). The transport rollers and separation rollers 22 and 23 are arranged between the front frame wall 271 and the rear frame wall 272 in the frame 27. A mount 2722$e$ of a second light emitter and a mount 2723$e$ of a third light emitter are attached to the rear frame wall 272. Moreover, mounts (not shown) of associated light collectors are attached. The mounts for a first sensor are visible from FIG. 3$a$ and likewise mounted on the back side of the rear frame wall 272. Photoelectric barriers are used as first, second and third sensors. A respective light emitter and a respective light collector are components of a photoelectric barrier.

In FIG. 4$a$, a block diagram is shown with a control unit 2.4 that is connected electrically with the sensors S1, S2, S3 and encoders EN1, EN2 and in terms of control with the drive motors M1 and M2. The control unit 2.4 has a processor 2.41 for automatic determination of input values, a program memory 2.42, and a memory 2.43 for the automatically determined input variables and for additional input variables entered manually. The control unit has a signal processing unit 2.44 for the signals of the sensors and the encoders EN1, EN2, as well as a determination unit 2.45 that determines the position of the flat item in the transport path. The aforementioned components—processor 2.41, signal processing unit 2.44 and the encoder EN2—operate in combination for the purpose of regulating the rotation speed for the drive motor M2 of the transport device. The known purpose of regulating the rotation speed is to keep the rotation speed constant, independent of fluctuations in the load or the power feed. A defined desired value of the transport velocity can thus be maintained.

For example, the aforementioned processor 2.41, signal processing unit 2.44, the third sensor S3 and the encoder EN2 cooperate in order to determine the length L of a mail piece. The third sensor S3 is advantageously designed as a photoelectric barrier. During the transport of a mail piece, an interruption of a light beam is detected by means of the third sensor S3 that the processor interprets as a leading edge of a mail piece, and a counter of the determination means 2.45 counts the pulses delivered from the encoder EN2. An additional light change that is detected by means of the third sensor S3 is interpreted by the processor as a trailing edge of the mail piece.

Due to the continued counting of the counter, the position of the mail piece or flat item in the transport path, results using the count value. The drive motor M2 is advantageously a direct current motor 285 that is controlled via the driver unit 2.49 of the control unit 2.4. The signal processing unit 2.44 and the processor 2.41 are used for measurement, control and regulation purposes for the motor. For example, a gap measurement is based on a first count value of the pulses of the encoder EN2 that is reached if the trailing edge of the mail piece is detected by means of the processor and sensor S3, and on a second count value of the pulses of the encoder EN2 that is reached when the leading edge of the subsequent mail piece is detected by means of the processor and sensor S3. The count spacing between the two count values corresponds to the current gap Dreal between the mail pieces. The determination of the increased transport velocity is only implemented by the processor 2.41 if the current gap Dreal is greater than the required minimum distance Dmin. The current gap Dreal and/or the length L of the flat item or mail piece can be determined by the control unit with at least one counter. For example, the at least one counter is a component of the determination unit 2.45 to determine the position of the mail piece given a plurality of path points on the transport path.

The aforementioned signal processing unit 2.44, determination unit 2.45 and driver units 2.49, 2.48 can be components of an input/output unit that is realized with discrete design elements.

Alternatively, a freely programmable gate array (FPGA) or an application-specific integrated circuit (ASIC) can be used. For example, the gap determination could be assumed by the FPGA. An FPGA is programmed as an input/output unit. A suitable programmable logic is the Spartan-II 3A FPGA from the company XILINX (www.xilinx.com), for example.

Figure 4A:
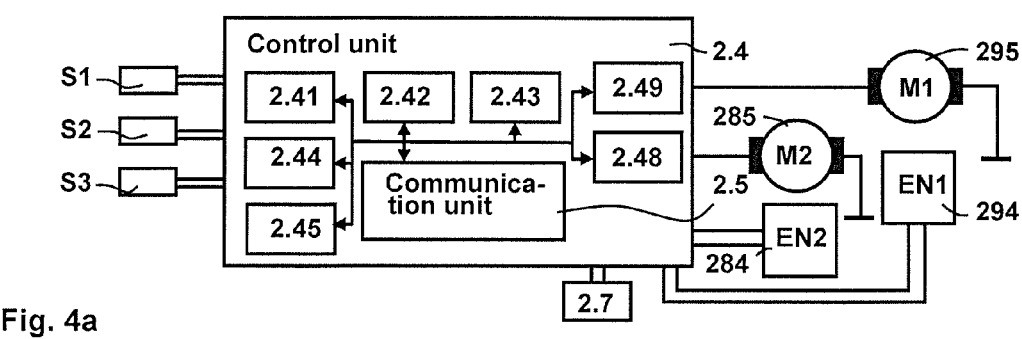
FIG. 4a is a block diagram of the basic components of the mail processing system.

The control unit 2.4 has a communication unit 2.5 which has a communication connection with a franking machine via an interface 2.7 (in a manner not shown). Alternatively, the communication unit 2.5 can be arranged externally of the control unit 2.4 and be connected with the latter by a communication path (FIG. 4a).

Although the invention has been explained in an exemplary embodiment using a block diagram, other block diagrams for other embodiments of the sensors and/or of the control unit are not precluded.

Figure 4B:
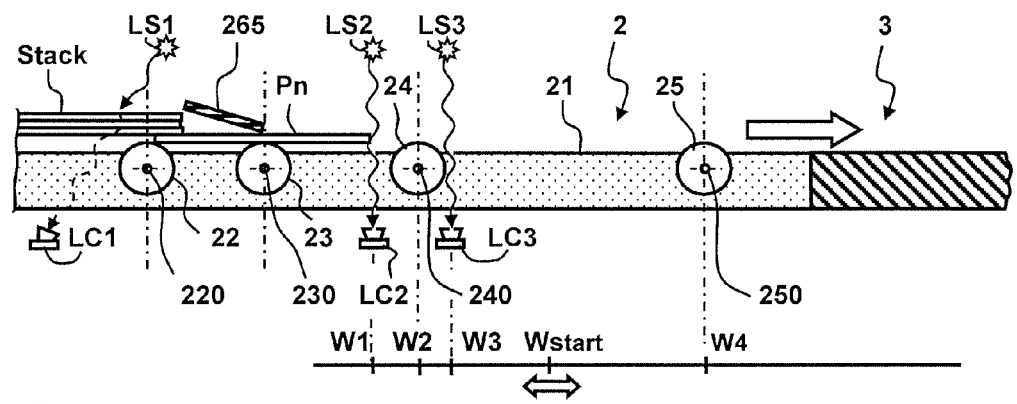
FIG. 4b schematically shows the principles of the feed in accordance with the invention.

The basic principle of the feed is shown in FIG. 4b. The feed station 2 respectively has two separation rollers 22, 23 arranged on the axle shafts 220, 230 and two transport rollers 24, 25. The latter are respectively arranged on the axle shafts 240, 250. The axle shafts 220, 230 and 240, 250 are driven at different times and with different revolution speed by the drive motors M1 and M2 (in a manner not shown) so that a mail piece Pn situated at the bottom in the stack is reliably separated. The sensors are designed as photoelectric barriers. The first sensor has a light emitter LS1 arranged above the feed deck 21 and a light collector LC1 arranged below the feed deck 21 that is coupled to the light emitter via a light beam and detects any interruption of said light beam. The sensors are identical in design but are arranged at different positions in the transport path. A gap is formed between the ramp plate 265 and the second separation roller 23 and limits the thickness of the mail piece to be separated. After separation, the mail piece Pn is transported further in the transport direction (white arrow) on the surface of the feed deck 21 along the transport path to the franking machine 3. Another flat item can similarly be separated from a stack and transported. The light emitter LS1 lies downstream (in terms of the mail flow) from the axle shaft 220, but the light collector LC1 lies upstream (in terms of the mail flow) from said axle shaft 220. The light emitters LS2 and LS3 are situated downstream (in terms of the mail flow) of the axle shaft 220 and orthogonally opposite the associated light collectors LC2 and LC3. The second photoelectric barrier LS2, LC2 is arranged upstream (in terms of the mail flow) of the axle shaft 240 of the first transport roller 24. Both are arranged orthogonal to the transport path. The associated path points W1, W2, W3 and Wstart are explained in the following using FIGS. 4c and 4d.

Figure 4C:
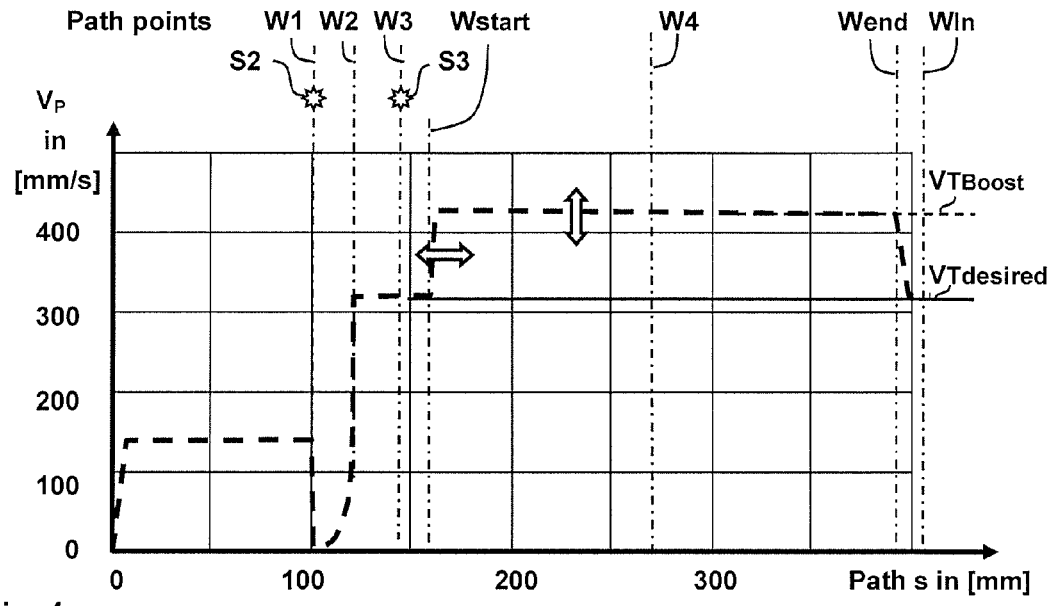
FIG. 4c is velocity/path diagram for a flat item in accordance with the invention.

FIG. 4c shows a velocity/path diagram for a mail piece transported in an accelerated manner. A path s traveled by the leading edge of the mail piece Pn+1 along the transport path is plotted in mm on the abscissa axis. The value of the velocity $V_P$ of the leading edge of the mail piece is indicated on the ordinate axis. The positions of the modules, path point W1 of the second sensor S2, path point W2 of the rotation axle shaft 240 of the first transport roller and path point W3 of the third sensor S3 follow one after another in the transport path. The aforementioned positions are aligned with the positions of the modules indicated in FIG. 4b, which has been explained using respective dash-dot lines. The function curve (drawn in a dashed line) shows the velocity $V_P$ of the leading edge of the mail piece Pn+1 as a rising and falling curve (upon stopping at S2 if necessary). Given a gap that is too small, the distance from the leading mail piece Pn is increased by the stoppage. A gap that is too large is reduced via a function curve—further increasing in steps—of the cello $V_P$ of the leading edge of the mail piece Pn+1 to a predetermined minimum distance from the first mail piece Pn. The increased velocity is started if the first mail piece (not shown) leaves the second transport roller, wherein the rotation axle shaft 250 of the second transport roller is arranged aligned with the fourth path point W4. The greater the gap, the more that the path start point is displaced forward, and the higher the calculated value for the increased transport velocity VTBoost. The path end point Wend of the transport path lies before the path intake point WIn at which the mail piece Pn+1 is transferred from the feed station to the franking machine with a predetermined transport velocity VTdesired.

Figure 4D:
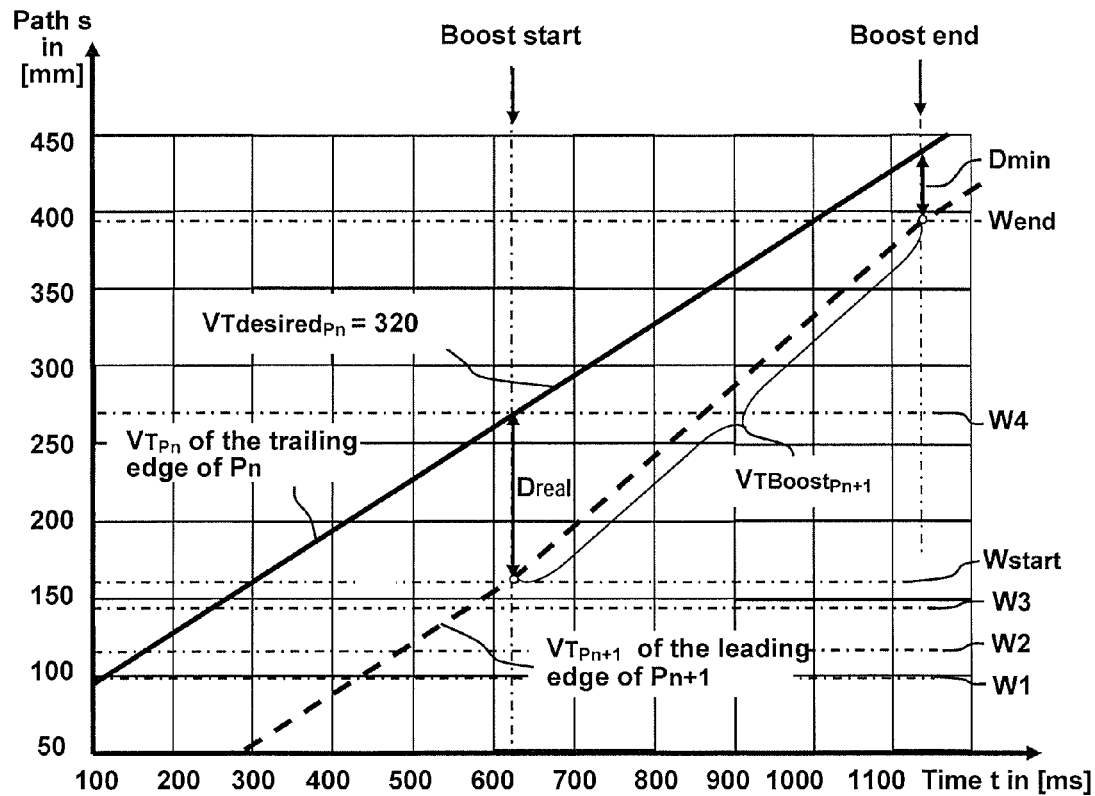
FIG. 4d is a time path diagram for a mail piece and a following mail piece.

FIG. 4d shows a time/path diagram with a solid curve for the mail piece Pn and with a dashed curve for the mail piece Pn+1. The first mail piece Pn is transported with a predetermined transport velocity VTdesired=constant. The second mail piece Pn+1 initially follows the first mail piece Pn with the same transport velocity with a distance. The current gap Dreal—thus the initial distance of the mail pieces—is determined when the mail piece Pn+1 reaches the sensor S3 at the path point W3. The gap is maintained until the trailing edge of the first mail piece Pn leaves the fourth path point W4. The beginning of a velocity increase to $VTBoost_{P_{n+1}}$ for the mail piece Pn+1 is situated where the mail piece Pn leaves the second transport roller. This is apparent from the bend in the function curve with the dashed curve. The current gap Dreal is reduced to a minimum gap Dmin in the further curve. The leading edge of the second mail piece Pn+1 then reaches the previously calculated path end point.

A representation of the individual phases of the transport of a flat item arises from FIGS. 5a-5j, which are explained in connection with FIG. 6.

Figure 6:
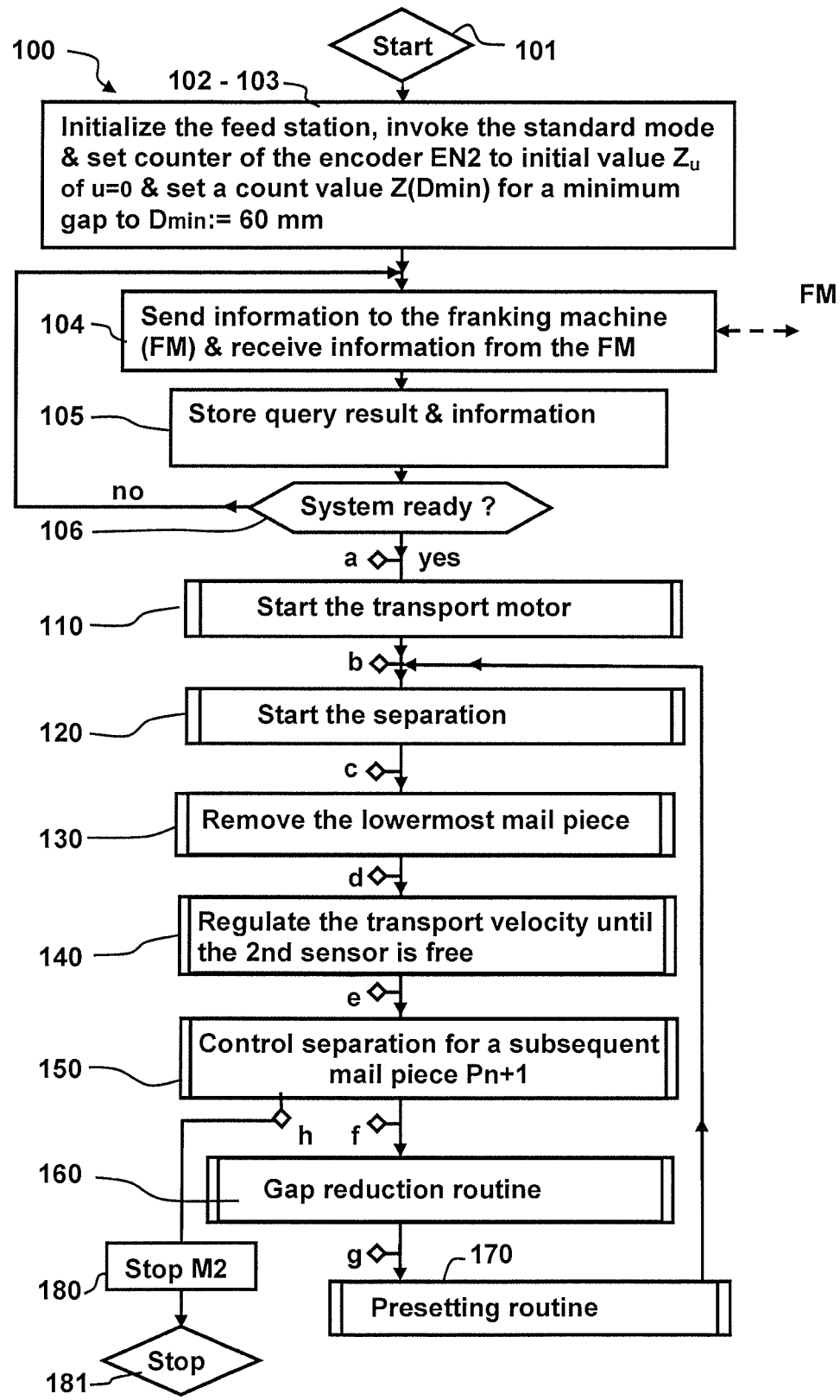
FIG. 6 is a flowchart of an embodiment of a program for operating a mail processing system in accordance with the invention.
Figure 7:
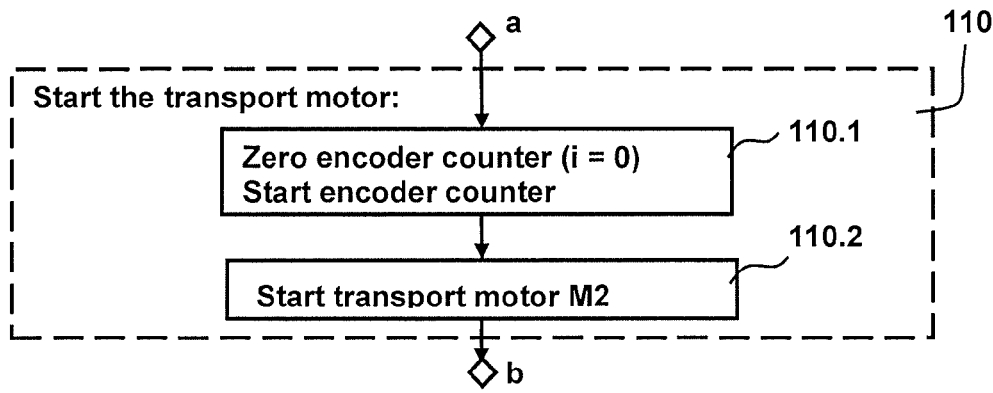
FIGS. 7 through 12 are flowcharts for sub-programs of the program shown in FIG. 6.
Figure 8:
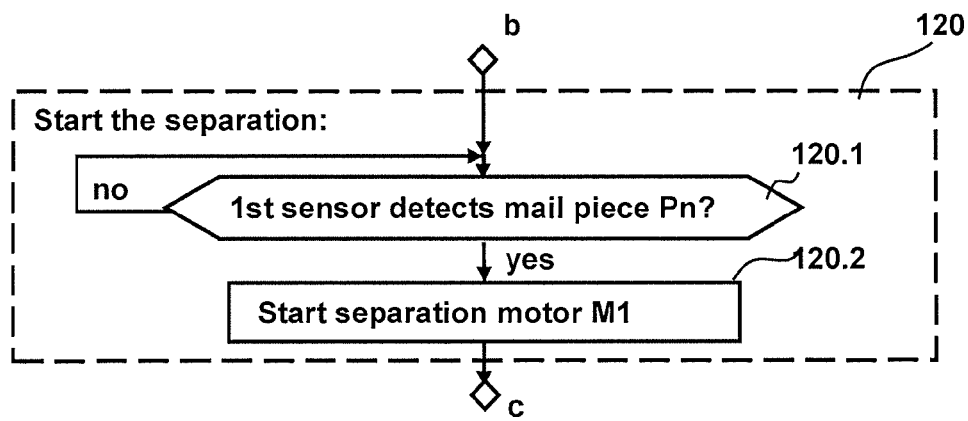
Figure 9:
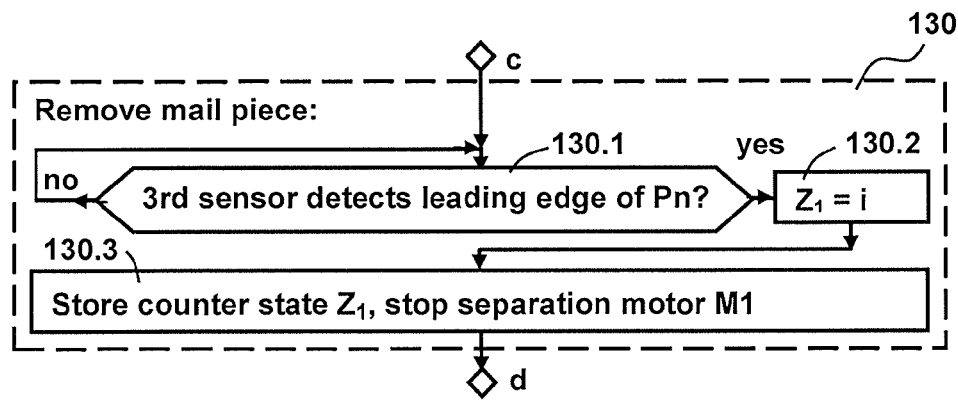

A program flowchart for a processor of the control unit is shown in FIG. 6, and sub-programs for the program workflow plan are shown in FIGS. 7 through 12. The program workflow plan 100 according to FIG. 6 provides Steps 102-103 for initialization of the feed station after a start Step 101. The processor of the control unit is programmed to load an associated user program and initial parameters after an initialization in order to subsequently invoke a standard mode in which the feed station can operate. The initial parameters are desired values for at least:

the first predetermined transport velocity in the standard mode, the minimum distance of the mail pieces from one another, or the minimum distance of the leading edges of successive mail pieces.

Figure 5A:
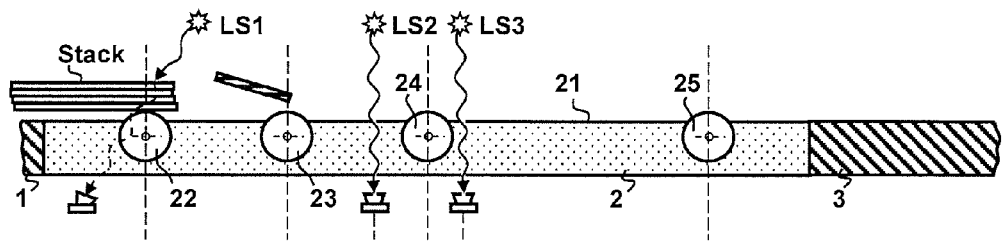
FIGS. 5a-5j show the individual phases of the transport of a flat item in accordance with the invention.
Figure 5B:
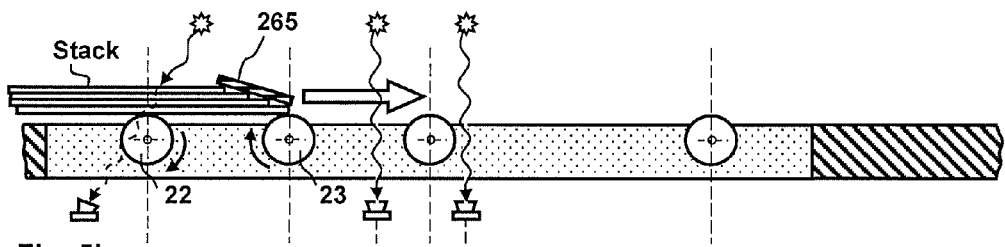
Figure 5C:
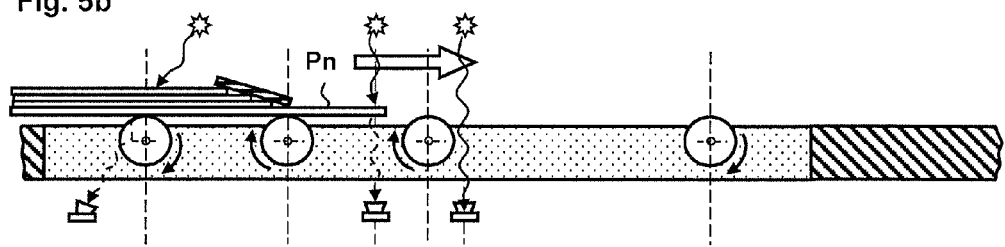
Figure 5D:
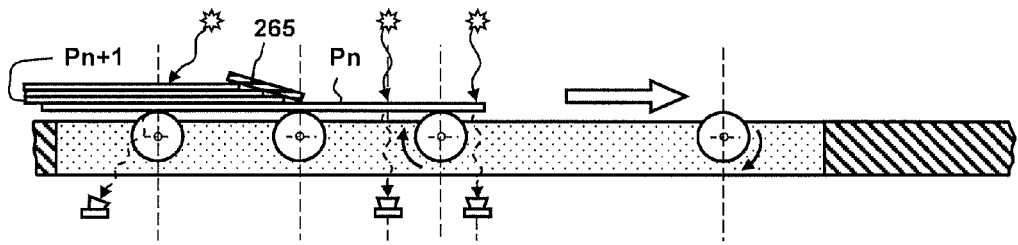
Figure 5E:
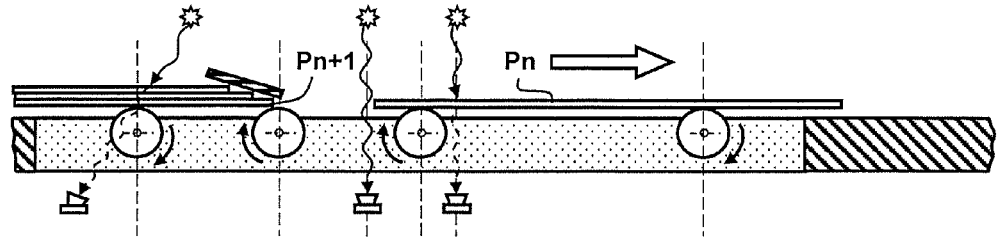
Figure 5F:
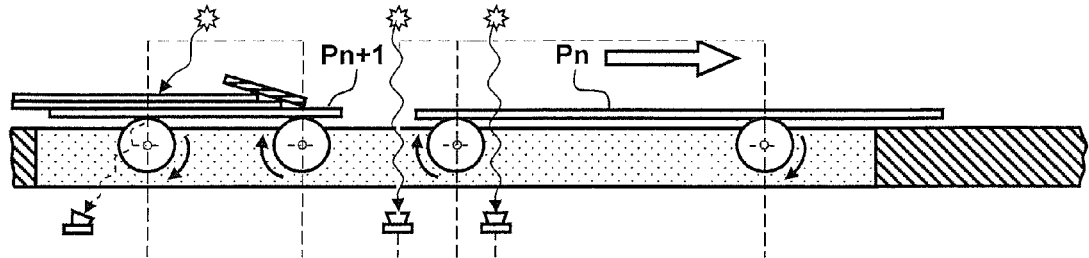

In the pre-separation region, a stack of mail pieces is placed on the feed deck and the first separation roller 22 of the feed station 2 (see FIG. 5*a*).

In Step 104, information is sent to the franking machine and received from the franking machine. This naturally requires that the entire system (apparent in FIG. 1) be turned on. In the operationally ready mode, the franking machine waits after the system has been started. An information sent from the franking machine to the feed station is received and recognized by the latter and stored in Step 105.

Figure 10:
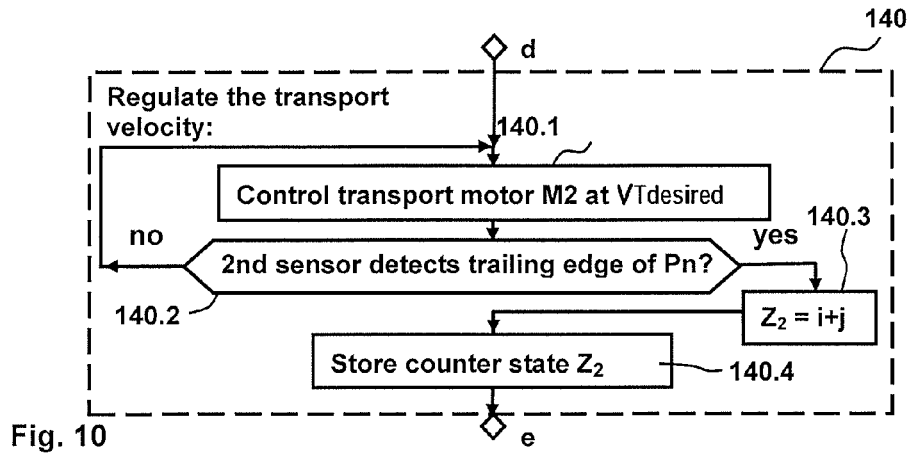

The workflow now branches back to Step 104 if the system is not yet ready. Otherwise, the workflow branches to the sub-program 110 (see FIG. 7) in which the encoder counter is reset and then restarted (Step 110.1), following which the transport is started (Step 110.2). The sub-program 120 (and thus the separation) is subsequently started (see FIG. 5*b* and FIG. 7); if the first sensor detects a mail piece Pn (Step 120.1), the separation motor is M1 activated (Step 120.2). In the following sub-program 130, in Step 130.1 (FIG. 9) a query is made as to whether it has already been detected by the third sensor that the leading edge p(n) of the first mail piece Pn has arrived in its detection region. A Step 130.2 follows if this is the case. The determination of the first count state $Z_1=i$ (see FIG. 2*a*) arises from Step 130.2. The value of the first count state $Z_1$ is stored in a non-volatile manner (how is not shown) in a memory means of a control unit of the feed station in Step 130.3 of the sub-program. Moreover, in Step 130.3 the separation is stopped (see FIG. 5*d* and FIG. 9). The mail piece lying at the very bottom of the mail stack can now be removed from said mail stack by rotating the first transport roller, wherein a free-running of the separation rollers is active. The workflow subsequently branches to the sub-program 140 (FIG. 10).

In the sub-program 140, a regulation of the transport velocity to the first predetermined desired value for the mail piece Pn (see FIG. 5*e* and Step 140.1 in FIG. 10) as long as the mail piece Pn is transported further below the second sensor. An additional count value is present as soon as the trailing edge of the mail piece Pn leaves the region detected by the second sensor. This value is determined as a second count state $Z_2=i+j$. In a later, additional step (not shown), for example, the length L of the mail piece Pn can be determined from the count states $Z_1$ and $Z_2$. The value of the second count state $Z_2$ is stored in a non-volatile manner (how is not shown) in the memory means of a control unit of the feed station in Step 140.4 of the sub-program 140.

In the sub-program 150 following this, a separation of the subsequent mail piece Pn+1 can be controlled (see FIG. 5*f* and FIG. 11) as long as an additional mail piece Pn+1 is still present at the feed station, which is queried in Step 150.1. However, if the query in Step 150.1 yields that an additional mail piece Pn+1 is present at the feed station, the separation motor M1 is started again (Step 150.2) and a point f is reached after passing through Steps 150.3-150.14 (see FIG. 11). In the event that no additional mail piece Pn+1 is present at the feed station, a point h is then reached, the workflow branches to Step 180, and the transport motor M2 is deactivated when mail pieces are no longer located in the transport region.

A stop step 181 is subsequently reached that ends the routine 100. In the sub-program 150, a further count state of the encoder counter is determined if the third sensor detects the Pn trailing edge, which is queried in Step 150.4. In the following Step 150.4, a third count state $Z_3$ is calculated. The value of the third count state $Z_3=i+k$ applies as a datum of a preceding mail piece (see also FIG. 2*b*) and is stored in a non-volatile manner in memory means 2.43 of the control unit 2.4 in Step 150.5.

Figure 5G:
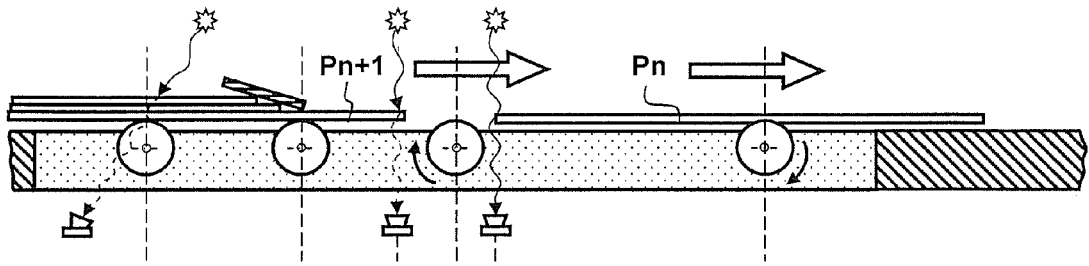
Figure 5H:
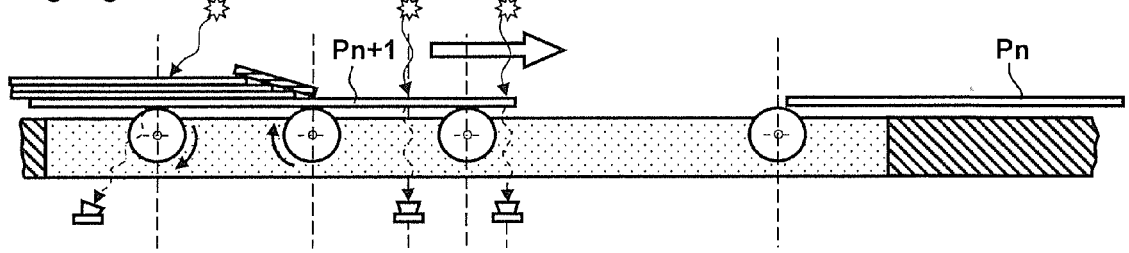
Figure 11:
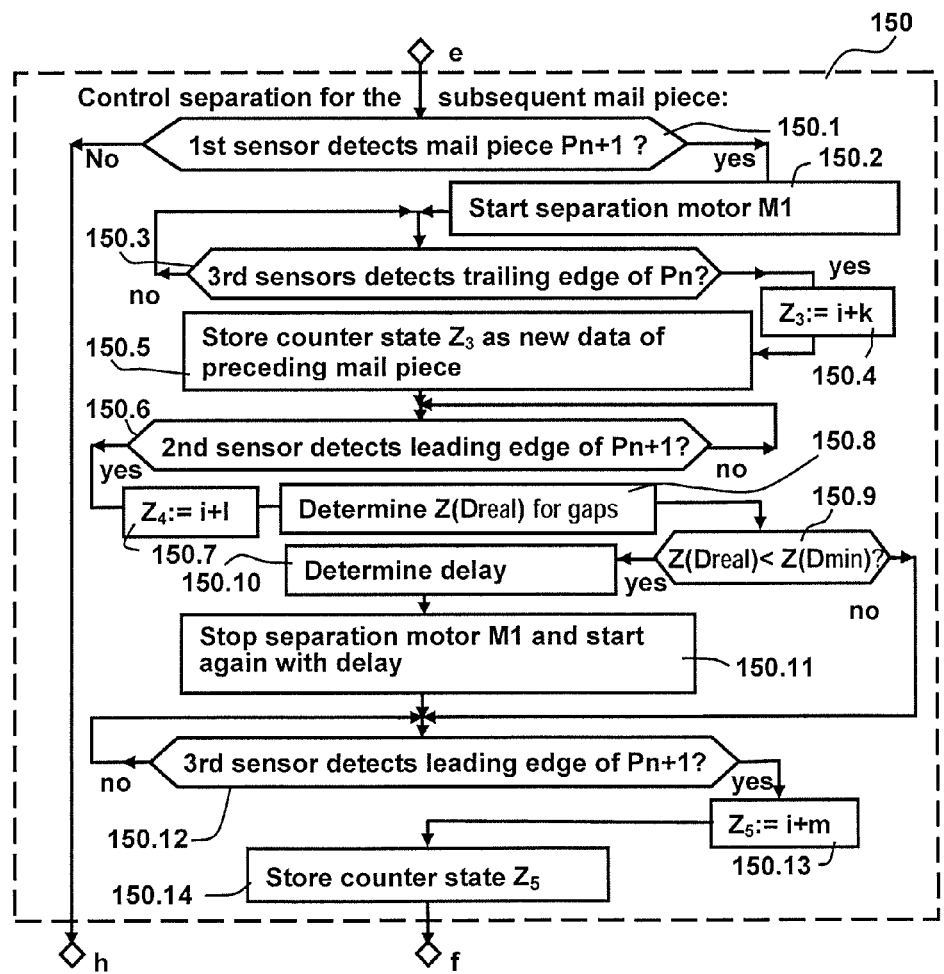

In sub-program 150, the separation motor M1 is also stopped and started again with a delay if the second sensor detects the leading edge of the subsequent mail piece Pn+1 and a gap Dreal<Dmin has been determined (see FIG. 5*g* and FIG. 11). The delay is calculated so that the minimum distance is achieved or exceeded. The processor can calculate the delay based on the present encoder count states and the known transport velocity. In Step 150.7 the count state $Z_4$ is determined from $Z_4=i+1$.

If, in running through the steps of the sub-program 150 in Step 150.12, it is established that the third sensor detects the leading edge of the current mail piece Pn+1, a value i+m is then present as a count state $Z_5$ (FIG. 2*b*) that is stored as a current mail piece datum. In Step 150.13, the count state $Z_5$ is determined. A numerical value for the current gap Dreal results from the difference $Z_5-Z_3=Z(Dreal)$ corresponding to Equation (1), which is used in the calculation of boost parameters in the gap reduction routine 160.

Figure 12:
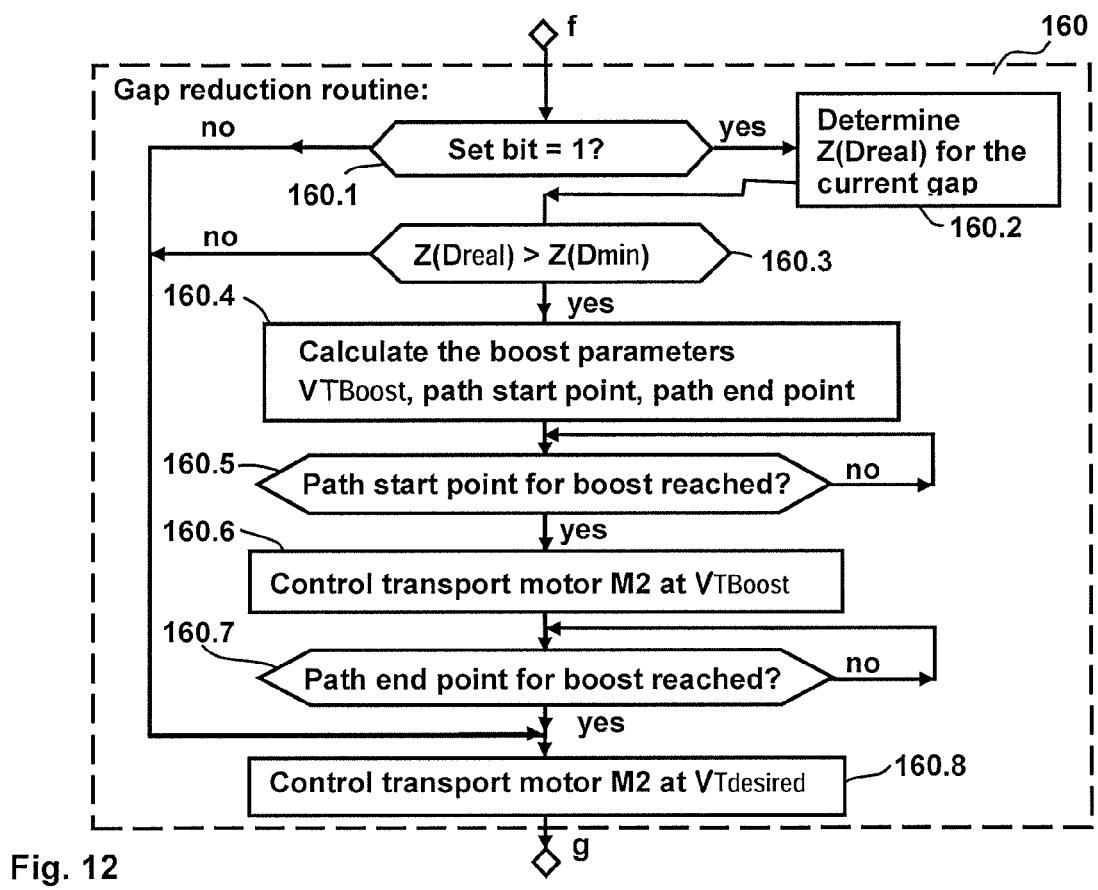

The gap reduction routine 160 is explained using FIG. 12. This can also be deactivated by a bit. In a first query Step 160.1 a check is made as to whether a bit is set to a value of 1. The workflow branches to an eighth Step 160.8 if no bit is set to a value of 1. If a bit is set to a value of 1, though, an implementation of the gap reduction routine then takes place and a second Step 160.2 is reached in which a gap measurement is implemented with the participation of the third sensor S3, the principle of which has already been explained below FIG. 2*b*. A query Step 160.3 is then reached in which—using numerical values—a check is made as to whether the set minimum path gap Dmin is smaller than the currently measured gap Dreal between two successive mail pieces. If yes—thus if the minimum path gap has been exceeded—the boost parameters are then calculated by the processor in the following Step 160.4. The principle of the boost parameter calculation has already been explained using FIG. 2*b*. If no—thus if the minimum path gap has not been exceeded—the workflow branches back again to the eighth Step 160.8.

After the boost parameters have been calculated by the processor, a query Step 160.5 is reached in which a check is made as to whether a path point W4 has been reached by the trailing edge of the mail piece Pn (predecessor). The leading edge of the current separated mail piece Pn+1 has then reached the path start point, and the boost for an increased transport velocity of the currently separated mail piece Pn+1 can be started. However, if that is not the case, in a wait loop the workflow waits for the event that the path start point has been reached. However, if that is the case the drive motor M2 of the transport device is then controlled in Step 160.6 in order to achieve the increased transport velocity VBoost. In a subsequent query Step 160.7, a check is made as to whether a path end point has been reached by the current mail piece Pn+1. However, if that is not the case, in a wait loop the workflow waits for the event that the path end point has been reached by the current mail piece Pn+1. However, if that is the case, the eighth Step 160.8 is reached. The drive motor M2 of the transport device is controlled in the eighth Step 160.8 in order to achieve the desired transport velocity VTdesired and keep it constant. The workflow subsequently branches to the point g. Due to the gap reduction routine 160 (FIG. 12), the set minimum distance between two successive mail pieces (of approximately 60 mm, for example) is achieved even when a slippage occurs in the transport of mail pieces. A point g is subsequently reached, and therefore a beginning of an additional sub-program 170 which is used to automatically preset the control unit in order to achieve the desired throughput of mail pieces given maximum certainty of separation.

Figure 5I:
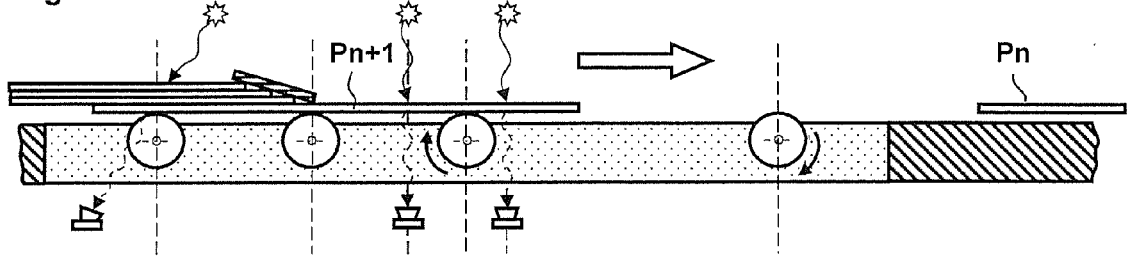
Figure 5J:
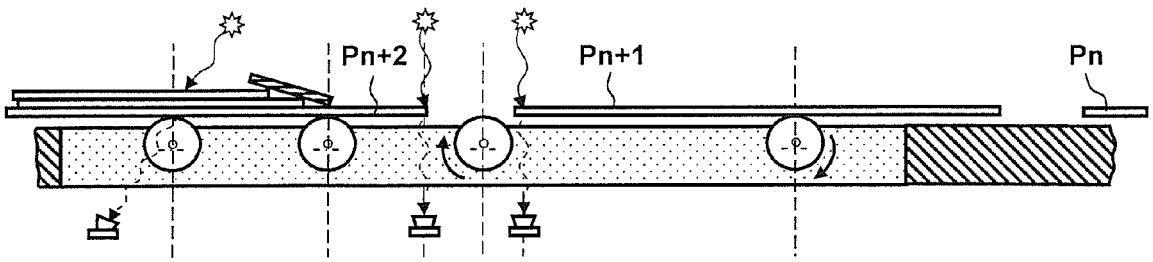

From Step 170, the workflow branches to the point b and the routine with Steps 120 through 170 is repeated for a subsequent mail piece. In FIG. 5*i*, a phase is shown in which the subsequent mail piece Pn+1 is removed from the stack. The desired values cited earlier apply. The mail piece Pn+1 is transported by the transport device similar to as was shown for the mail piece Pn in FIG. 5*f*. The stack is then additionally separated further, wherein the leading edge of a subsequent mail piece Pn+2 is transported up to the second sensor S2 by the separation device (FIG. 5*j*, FIG. 11). The minimum path gap (60 mm, for example) between two successive mail pieces is achieved due to a routine 150.

The second sensor S2 is arranged upstream (in terms of the goods flow) and the third sensor S3 is arranged downstream (in terms of the goods flow) of the first transport roller 24 on the transport path, and that the distance D between adjacent flat items and/or the length L of the flat item is determined by the control unit 2.4 with the participation of one of the two sensors S2, S3.

Alternatively, the gap between mail pieces and/or the length L of the mail pieces can be determined by the control unit by means of a plurality of counters and with the participation of one or more sensors that are arranged in the transport path.

Alternatively, the path start point can be established so as to be invariable before the fourth path point W4. The trailing edge of the first mail piece then has certainly passed the fourth path point W4 if the leading edge of the current transported mail piece reaches the path start point given a count state Z(Wstart)=Z3+Z(U) with U≥A. The greater the gap, The higher that the calculated value for the increased transport velocity VTBoost must be, but without displacing the path start point forward. The path end point Wend of the transport path continues to be situated before the path intake point WIn.

Flat items, other than mail pieces and letters, which are stackable and should be separated can be transported in accordance with the invention as well.

Although modifications and changes may be suggested by those skilled in the art, it is the intention of the inventors to embody within the patent warranted hereon all changes and modifications as reasonably and properly come within the scope of their contribution to the art.

I claim as my invention:

1. A feed station to feed a flat item that is supplied individually after separation from a stack to a subsequent goods processing apparatus, comprising a pre-separation region, with a separation region, and with a transport region; wherein the transport region is arranged on a transport path after the separation region in the transport direction; wherein the feed station comprises motors with associated encoders, additional mechanical drive elements, sensors and a control unit to control a transport device; and wherein the control unit is connected in terms of wiring at its inputs with a number of sensors and encoders, and wherein:

the sensors and drive elements are arranged in a frame of the feed station at a respective positions that are orthogonal to the transport path, such that an orthogonal depiction of each position respectively corresponds to a path point on the transport path, and such that the path points are situated in a row in the transport direction;

a first path point W1 is orthogonal to the position of a second sensor, a second path point W2 is orthogonal to the position of a rotation axle shaft, of a first transport roller, a third path point W3 is orthogonal to the position of a third sensor, and a fourth path point W4 is orthogonal to the position of a rotation axle shaft of a second transport roller;

a first distance is provided between the third path point W3 and the fourth path point W4 and a second distance is provided between the fourth path point W4 and a path end point Wend, wherein the path end point lies at a third distance from a subsequent path intake point WIn, wherein the path intake point WIn can be depicted on the transport path orthogonal to the position of a rotation axle shaft of a drive element at the intake of the subsequent goods processing apparatus;

distances W1, W2, W3 and W4 are respectively constant with a first distance A between W3 and W4 being smaller than a minimum length of the flat items to be transported, the first distance A is greater than or equal to a second distance B between W4 and a path end point Wend, and a distance C between Wend and a path intake point WIn is much smaller than the second distance B; and the control unit of the feed station is programmed to control the transport velocity of the transport device so that a distance D, determined at the start of the transport region, between the separated flat items is reduced to a minimum distance and is always of the same size when these leave the feed station.

2. A feed station according to claim 1, wherein the control unit of the feed station:

i) has at least one determination means to determine the position of the flat item in the transport path and has a processor, wherein the processor determines and stores count values by means of a counter and an encoder of the transport device with the participation of one of the sensors, wherein the count values respectively correspond to a number of encoder pulses; wherein a respective count state is reached when a flat item arrives at at least one selected path point of a transport path; wherein the processor is configured via an application program stored in a program memory of the control unit to:

determine via calculation the respective position of the current separated flat item and of the previously transported flat item, as well as the distance D between the leading edge of the current separated flat item and the trailing edge of the previous transported flat item, to calculate a number of boost count parameters Z(VTBoost), Z(Wstart), Z(Wend) to temporarily achieve an increased transport velocity VTBoost of a current separated flat goof in a boost count region in order to reduce the determined distance D to the minimum distance between the successive separated goods, wherein a boost count region ZBoost results from the sum of the count value Z(D) for the distance D and a fixed count value Z(B) for the second distance (B); wherein Z(D)≤Z(A); and wherein a predetermined transport velocity VTdesired has been stipulated between the feed station and a subsequent goods processing apparatus in order to transition separated flat items from the feed station to the goods processing apparatus, wherein the predetermined transport velocity VTdesired corresponds to a fixed count value Z(VTdesired); and wherein the increased transport velocity VTBoost is greater than the stipulated, predetermined transport velocity VTdesired; wherein a boost count parameter Z(Wstart) for a path start point Wstart and a boost count parameter Z(Wend) for a path end point Wend are calculated, ii) and wherein the processor is connected at its outputs with a drive motor of the transport device which transports a current separated flat item downstream in terms of flow with the increased transport velocity VTBoost after the count state of the counter has reached the previously calculated count state Z(Wstart) for the path start point, wherein the increased transport velocity is maintained until the count state of the counter reaches the previously calculated count state Z(Wend) for the path end point; wherein a numerical value Z(VTBoost) for the increased transport velocity is determined from the multiplication of the boost count region ZBoost with a factor Z(C).

3. A feed station according to claim 2, wherein the count value Z(D) is a count value Z(Dreal) that is determined for a current gap at the start of the transport region, and in that the factor Z(C) results from the quotient of a numerical value Z(VTdesired) for the stipulated predetermined transport velocity VTdesired and the sum of a numerical value Z(Dmin) for the minimum distance and a numerical value Z(B) for the second distance B.

4. A feed station according to claim 2, wherein the control unit has a processor and a signal processing unit for the signals of the sensors and the encoder that cooperate with the determination means.

5. A feed station according to claim 1, wherein the third distance C is chosen to be so large that the position of the path end point Wend does not yet coincide with the position WIn on the transport path.

6. A feed station according to claim 1, wherein each flat item is a mail piece, and wherein at least one counter is a component of a determination unit and is configured to determine the position of the mail piece given a plurality of path points on the transport path; in that the determination by the processor takes place via the count state of the at least one counter of the determination means, wherein a count state of the counter, said count state resulting from the sum of a numerical value Z(A) for the distance A and a count state $Z_3$ that is measured when the trailing edge (q(n)) of a first mail piece (Pn) leaves the third sensor, is associated with the path start point Wstart; and wherein a count state of the counter, said count state resulting from the sum of a numerical value for the distance A, a numerical value for a distance B and a count state $Z_5$ that is measured when the leading edge (p(n+1)) of the current separated mail piece (Pn+1) reaches the sensor is associated with the path end point Wend.

7. A feed station according to claim 6, wherein the transport device is designed so that successive mail pieces (Pn) and (Pn+1) pass the third sensor, wherein count states of the counter are determined by the processor (2.41) upon passing the third sensor and a difference Δ between two count states $Z_5$ and $Z_3$ is determined which corresponds to a numerical value Z(Dreal)=$Z_5$−$Z_3$ which can be determined for the current gap (Dreal) that exists at the start of the transport region between the mail pieces (Pn) and (Pn+1) in immediate succession; in that the determination of the increased transport velocity is implemented by the processor only when the current gap (Dreal) is greater than the required minimum distance (Dmin); and in that the boost count region for a transport of the mail piece Pn+1 with the increased transport velocity is determined by the processor if it has been established that the third sensor detects the leading edge of the subsequent mail piece (Pn+1); wherein the boost region associated with the boost count region extends from the path start point Wstart to the path end point Wend on the transport path.

8. A feed station according to claim 2, wherein the second sensor is arranged upstream in terms of the goods flow and the third sensor is arranged downstream in terms of the goods flow of the first transport roller on the transport path, and the distance D between adjacent flat items and/or the length of the flat item is determined by the control unit with the participation of one of the two sensors.

9. A feed station according to claim 1, wherein the determination unit is formed partially or entirely by an FPGA.

10. A feed station according to claim 9, wherein a partial execution of the determination of the boost count parameters is assisted by software modules of the processor and/or additional discrete modules on the mainboard of the control unit that interact with the FPGA.

11. A feed station according to claim 7, wherein the position of a mail piece is reflected as a count state of the counter, wherein the count state for the position of the trailing edge of the first mail piece (Pn) precisely yields a third count state $Z_3$=i+k when the detection region of the third sensor is left by the first mail piece, and wherein a fifth count state $Z_5$=i+m is reached when the leading edge of the current separated mail piece (Pn+1) reaches the third path point W3 during the continued transport of the first mail piece (Pn), wherein the fifth count state $Z_5$ is greater than the third count state $Z_3$.

12. A feed station according to claim 1, wherein the subsequent item processing apparatus is a franking machine.

* * * * *